United States Patent [19]

O'Gorman et al.

[11] Patent Number: 5,557,690
[45] Date of Patent: Sep. 17, 1996

[54] METHOD AND SYSTEM FOR LOCATING OBJECTS WITH SUBPIXEL PRECISION

[75] Inventors: Lawrence P. O'Gorman, Madison; Everett F. Simons, Cedar Knolls, both of N.J.

[73] Assignee: AT&T Corp., Murray Hill, N.J.

[21] Appl. No.: 265,979

[22] Filed: Jun. 23, 1994

Related U.S. Application Data

[63] Continuation of Ser. No. 996,303, Dec. 23, 1992, abandoned.

[51] Int. Cl.$^6$ ........................................... G06K 9/00
[52] U.S. Cl. .............................. 382/151; 348/87; 348/95; 382/289
[58] Field of Search ........................................ 382/141, 144, 382/145, 151, 209, 218, 289, 287; 348/86, 87, 94, 95, 141

[56] References Cited

U.S. PATENT DOCUMENTS

| | | | |
|---|---|---|---|
| 4,209,830 | 6/1980 | Arimura et al. | 364/490 |
| 4,845,558 | 7/1989 | Tsai et al. | 382/8 |
| 4,932,064 | 6/1990 | Kasahara | 382/8 |
| 4,969,200 | 11/1990 | Manns et al. | 382/8 |
| 4,972,311 | 11/1990 | Holdgrafer et al. | 382/8 |
| 5,007,097 | 4/1991 | Mizuoka et al. | 382/8 |
| 5,119,435 | 6/1992 | Berkin | 382/8 |

OTHER PUBLICATIONS

"A Vision System For An Automatic Assembly Machine Of Electronic Components", by B. You, Y. S. Oh, and Z. Bien. IEEE Transactions on Industrial Electronics, Oct. 1990 No. 5 pp. 349–357.

"Automatic Visual Measurement Of Serface–Mount Device Placement", by D. W. Capson and R. M. C. Tsang, IEEE Transaction on Robotics and Automation, Feb. 1990, No. 1, pp. 44–52.

J. W. Hill, in "Dimensional Measurements from Quantized Images" *Machine Intelligence Research Applied to Industrial Automation*, by D. Nitzan, et al. SRI 10th Report for NSF Grant DAR78–27128, 1980, pp. 75–105.

L. Dorst and A. W. M. Smeulders, "Discrete Representation of Straight Lines", IEEE Trans. PAMI, PAMI–6, No. 4, Jul. 1984, pp. 450–462.

C. A. Berenstein, L. N. Kanal, D. Lavine and E. C. Olson, "A Geometric Approach to Subpixel Registration Accuracy", Computer Vision, Graphics, and Image Processing, vol. 40, 1987, pp. 334–336.

Z. Kulpa, "On the Properties of Discrete Circles, Rings, and Disks", Computer Vision, Graphics, and Image Processing, vol. 10, 1979, pp. 348–365.

A. Nakamura and K. Aizawa, "Digital Circles", Computer Vision, Graphics, and Image Processing, vol. 26, 1984, pp. 242–255.

Q. Tian and M. N. Huhns, "Algorithms for Subpixel Registration", Computer Vision, Graphics, and Image Processing, vol. 35, No. 2, 1986, pp. 220–233.

H. K. Nishihara and P. A. Crossley, "Measuring Photolithographic Overlay Accuracy and Critical Dimensions by Correlating Binarized Laplacian of Gaussian Convolutions", IEEE Trans. PAMI, vol. PAMI–10, No. 1, Jan. 1988, pp. 17–30.

C. B. Bose and I. Amir, "Design of Fiducials to Facilitate Inspection Using Machine Vision", IEEE PAMI, pp. 1196–1200 (Dec. 1990).

L. P. O'Gorman, A. M. Bruckstein, C. B. Bose and I. Amir, "Subpixel Registration Using a Concentric Ring Fiducial", 10th Int. Conf. Pattern Recognition, Atlantic City, pp. 249–253 (1990).

*Primary Examiner*—Joseph Mancuso
*Attorney, Agent, or Firm*—Jason P. DeMont; David N. Fogg; Vernon E. Williams

[57] ABSTRACT

A method of locating an object which has a straight edge is disclosed. An illustrative embodiment of the invention orients the object's edge so that it is at an oblique angle to the axis of the coordinate system of the sampling plane of the input device scanning the object. A subset of the pixels associated with the object's edge are identified and used to estimate the location of the object or edge.

12 Claims, 10 Drawing Sheets

METHOD AND SYSTEM FOR LOCATING OBJECTS WITH SUBPIXEL PRECISION

This application is a continuation of application Ser. No. 07/996,303, filed on Dec. 23, 1992, now abandoned.

FIELD OF THE INVENTION

The invention relates to automated guidance systems in general, and more particularly, to methods and systems for precisely locating and/or aligning objects.

BACKGROUND OF THE INVENTION

Automated manufacturing systems usually incorporate a machine vision system for locating an article's components in preparation for the components assembly. Typically, the article's quality is constrained by the precision with which the machine vision system can locate and thereby manipulate the article's components. Therefore, it is advantageous for a machine vision system to be able to locate an object with great precision.

Unfortunately, machine vision systems, like their biological counterparts, have physical limitations which hinder their ability to precisely determine the location of an object. In animals these limitations includes the number and sensitivity of the rods and cones in the eye. In machine vision systems the physical limitations include the number and sensitivity of discrete photoreceptors in the system's video camera.

Currently, a videocamera can be fabricated which comprises a large number of highly sensitive photoreceptors. Its cost, however, can be prohibitive. Low cost, low resolution videocameras are commercially available but they often cannot provide the precision that is needed. It would be advantageous, therefore, if objects could be located precisely with low resolution equipment.

SUMMARY OF THE INVENTION

The present invention enables an object to be located with an input device (e.g., a videocamera) very precisely while avoiding many of the costs and restrictions associated with prior techniques. These results are obtained in an illustrative embodiment of the present invention which advantageously controls a viewed object's shape and orientation so as to promote the destructive interference of the distortion introduced by the videocamera.

While the nomenclature used in this specification is that most commonly used in the arts of machine vision and automated manufacturing, it will be clear to those skilled in the art how to make and use embodiments of the present invention which use other than optical technologies and which solve problems in arts other than manufacturing. Embodiments of the present invention are useful in, inter alia, remote sensing and robotics.

DETAILED DESCRIPTION

I. Introduction

For clarity of explanation, the illustrative embodiments of the present invention are described as comprising individual operation blocks (including operation blocks labeled as "processors"). The functions these blocks represent may be provided through the use of either shared or dedicated hardware, including, but not limited to, hardware capable of executing software. (Use of the term "processor" should not, therefore, be understood to refer only to fixed functional elements and hardware capable of executing software.) Embodiments of the present invention may comprise digital signal processor (DSP) hardware, such as the AT&T DSP16 or DSP32C, used in combination with associated software to perform the functions and operations discussed below.

The nomenclature used in this specification is that most commonly used in the art of machine vision. The use of these terms, however, should not be understood to imply that only optical devices can be used to create the signals which are processed. It will be clear to those skilled in the art of mechanical assembly, inspection or alignment how to fabricate embodiments of the present invention which use different forms of input devices.

The detailed description comprises three sections in addition to this introduction. Section II describes an illustrative embodiment of the present invention. The illustrative embodiment is part of an automated manufacturing system which inserts components into a printed circuit board with a robot insertion tool. In order that the robot be able to place the components into the board in the right place, it is advantageous that the robot be capable of precisely locating the board. To facilitate this process, the illustrative embodiment advantageously locates each printed circuit board by fixing a bearing on the centroid of each of one or more landmarks on each printed circuit board. These landmarks are known as fiducial registration marks or fiducials. Section III describes a set of criteria for designing an advantageous fiducial and Section IV describes the process used by the illustrative embodiment to fix a bearing on a fiducial.

The following U.S. patents are hereby incorporated as if set forth in their respective entirety: (1) K. Fujiwara et al., U.S. Pat. No. 4,621,406, issued Nov. 11, 1986 entitled "Electronic Component Insertion Apparatus;" (2) R. V. Lubrano et al., U.S. Pat. No. 4,984,355, issued Jan. 15, 1991 entitled "Tool for Inserting/Extracting Package from Socket on PC Board;" (3) N. S. Zaremba et al., U.S. Pat. No. 4,868,975, issued Sep. 26, 1989 entitled "Tool for Inserting Dual In-Line Packaged Circuits into Printed Circuit Board Sockets;" and (4) P. Mengel et al., U.S. Pat. No. 5,031,224, issued Jul. 9, 1991 entitled "Flexible Recognition of Subject Structures in Color and Half-tone Images."

II. The Illustrative Embodiment

Figure 1:
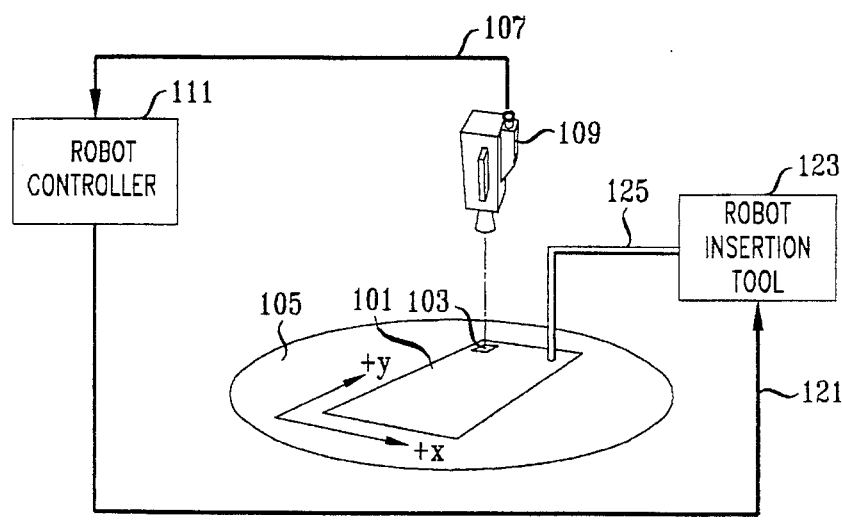
FIG. 1 presents a diagram of an illustrative embodiment of the present invention.

FIG. 1 depicts an illustrative embodiment of the present invention which inserts components into a printed circuit board without human intervention. The illustrative embodiment advantageously comprises: printed circuit board 101, a two- or three-dimensional object (such as fiducial 103) on printed circuit board 101 which object appears from the perspective of an input device (such as videocamera 109) to have at least one substantially straight edge, support 105 for substantially holding printed circuit board 101 in the X-Y plane and substantially at a predetermined angular orientation within that plane, videocamera 109 for scanning fiducial 103 and creating a set of video signals which represent the field of view of the videocamera, a monitoring station (such as robot controller 111) for processing the video signals generated by videocamera 109, robot insertion tool 123 (with robot arm 125) for inserting components into printed circuit board 101, lead 107 for carrying the video signals generated by videocamera 109 to robot controller 111, and lead 121 for carrying the signals representing the X-Y coordinates of fiducial 103 to robot insertion tool 123.

Figure 4A:
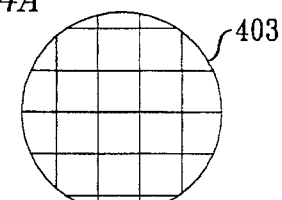
FIG. 4 depicts a sampling window comprising a 128×128 array of image elements arranged in orthogonal rows and columns.
Figure 4:
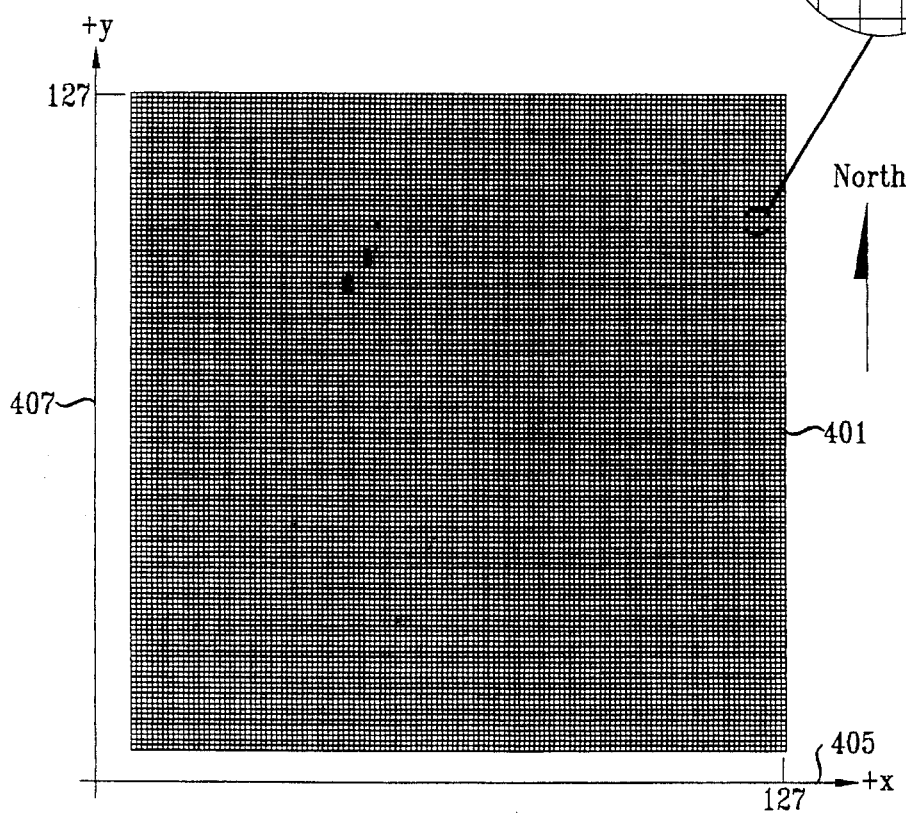
Figure 2:
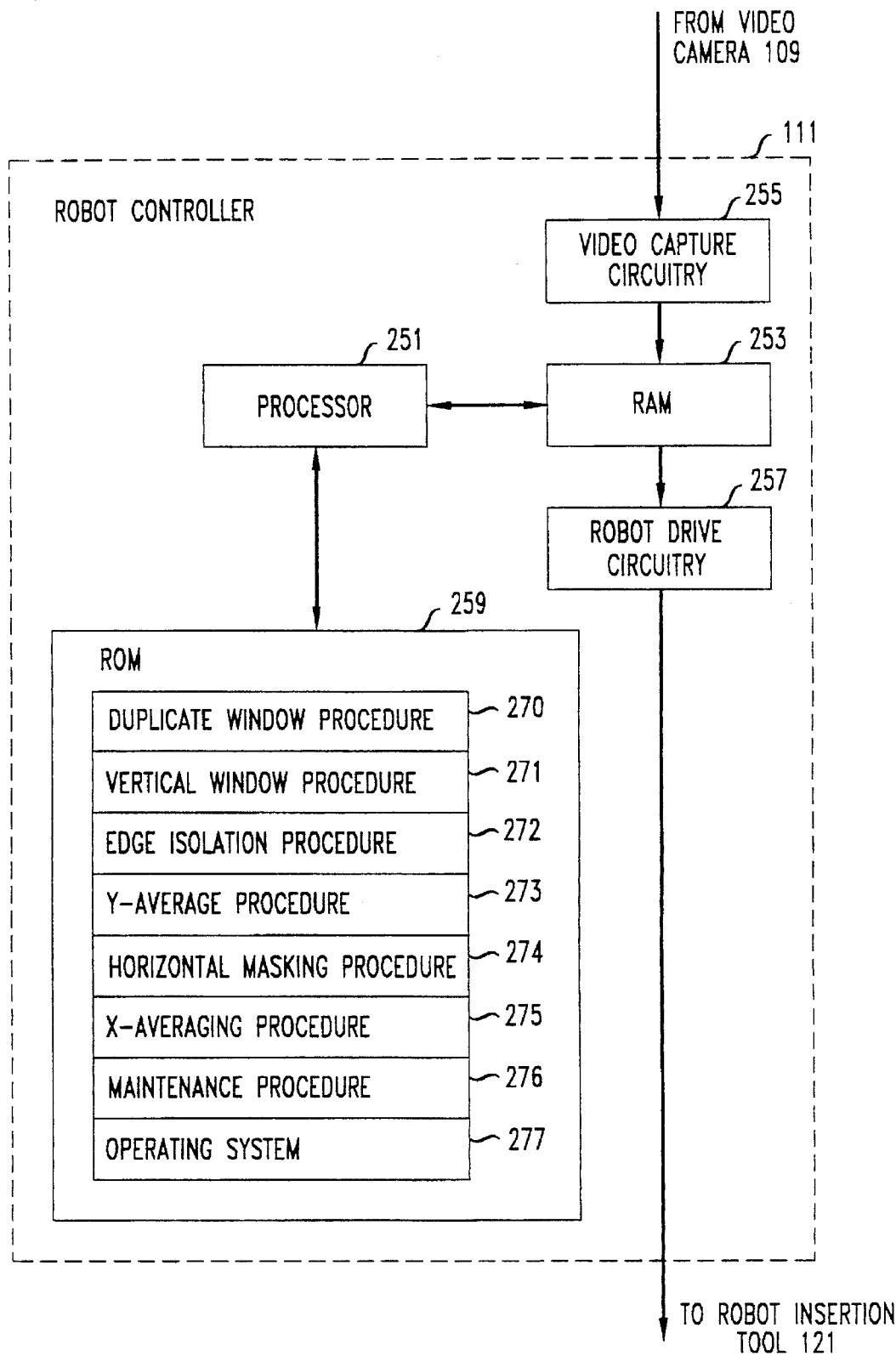
FIG. 2 presents a diagram of an illustrative robot controller as shown in FIG. 1.

As shown in FIG. 2, robot controller 111 advantageously comprises video capture circuitry 255, read-write memory (such as RAM 253), general purpose processor 251, read-only memory (such as ROM 259), and robot drive circuitry 257. It is preferred that video capture circuitry 255 receive a single video frame generated by videocamera 109 and apply the signals in that frame in ordered sequence into RAM 253 to create a "sampling window" (such as that depicted at 401 in FIG. 4) comprising an 128×128 array of "image elements" (illustrative ones of which are depicted at 403 in FIG. 4A). Processor 251, utilizing one or more procedures stored in ROM 259, advantageously analyzes the image elements in the sampling window to estimate the location of fiducial 103. When processor 251 has estimated the position of fiducial 103, robot drive circuitry 257 conveys that location to robot insertion tool 123 via lead 121.

It is preferred that printed circuit board 101 be held by support 105 substantially at a predetermined angular orientation so that printed circuit board 101 substantially lies in the X-Y plane and is substantially restrained from rotating around the Z axis. In embodiments where support 105 does not substantially restrain printed circuit board 101 from rotating around the Z axis, printed circuit board 101 may advantageously comprise a plurality of distinct fiducials so that the orientation and location of printed circuit board 101 may nevertheless be estimated. It will be clear to those skilled in the art how to fabricate embodiments of the present invention when printed circuit board 101 comprises multiple fiducials.

III. Creating the Fiducial

The shape, size and orientation of fiducial 103 on printed circuit board 101 advantageously conforms to the following criteria.

Figure 6:
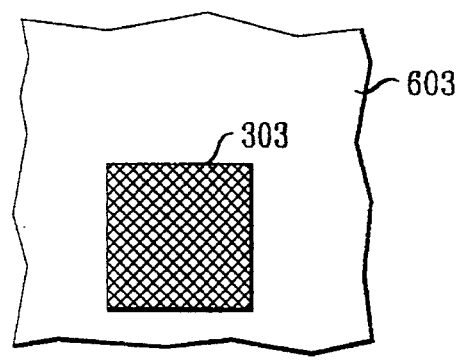
FIG. 6 depicts an illustrative fiducial as shown in FIG. 1.

Shape. Fiducial 103 is preferably a solid black square (such as that shown at 103 in FIG. 6) which is set against a highly contrasting (such as white) background which is large enough so that the field of view of videocamera 109 only contains images of fiducial 103 and background 603. It will be clear to those skilled in the art that fiducial 103 may alternately be a rhombus, a trapezoid or any other shape which from the perspective of videocamera 109 appears to have at least one substantially straight edge.

Size: It is preferred that the size of fiducial 103 be set so that, when viewed from videocamera 109, fiducial 103 occupies approximately 25% of the field of view of videocamera 109.

It is advantageous for the length of each side, d, of fiducial 103 to be set so that the distortions introduced into the sampling window because of the physical limitations of videocamera 109 destructively interfere. Therefore, the length of each side of fiducial 103 preferably equals:

$$d = \left[ \frac{n+1}{2n} \right] f \qquad \text{(Eq. 1)}$$

where n is the number of rows (or columns) in the sampling window and f is the field of view, in linear measure, of videocamera 109 (as projected onto the plane containing the fiducial). In the illustrative embodiment, the sampling window contains 128 rows and 128 columns and has a field of view on the sampling plane of 1.0". From equation (1) the length of each side of fiducial 103 is advantageously set to:

$$d = \left( \frac{128+1}{256} \right) 1.0" = 0.504"$$

It will be clear to those skilled in the art how to set d for different values of f and n.

It will be clear to those skilled in the art how to fabricate embodiments of the invention which satisfy equation (1) with any predetermined size fiducial by adjusting the distance between the focal plane of videocamera 109 and the fiducial.

Figure 7:
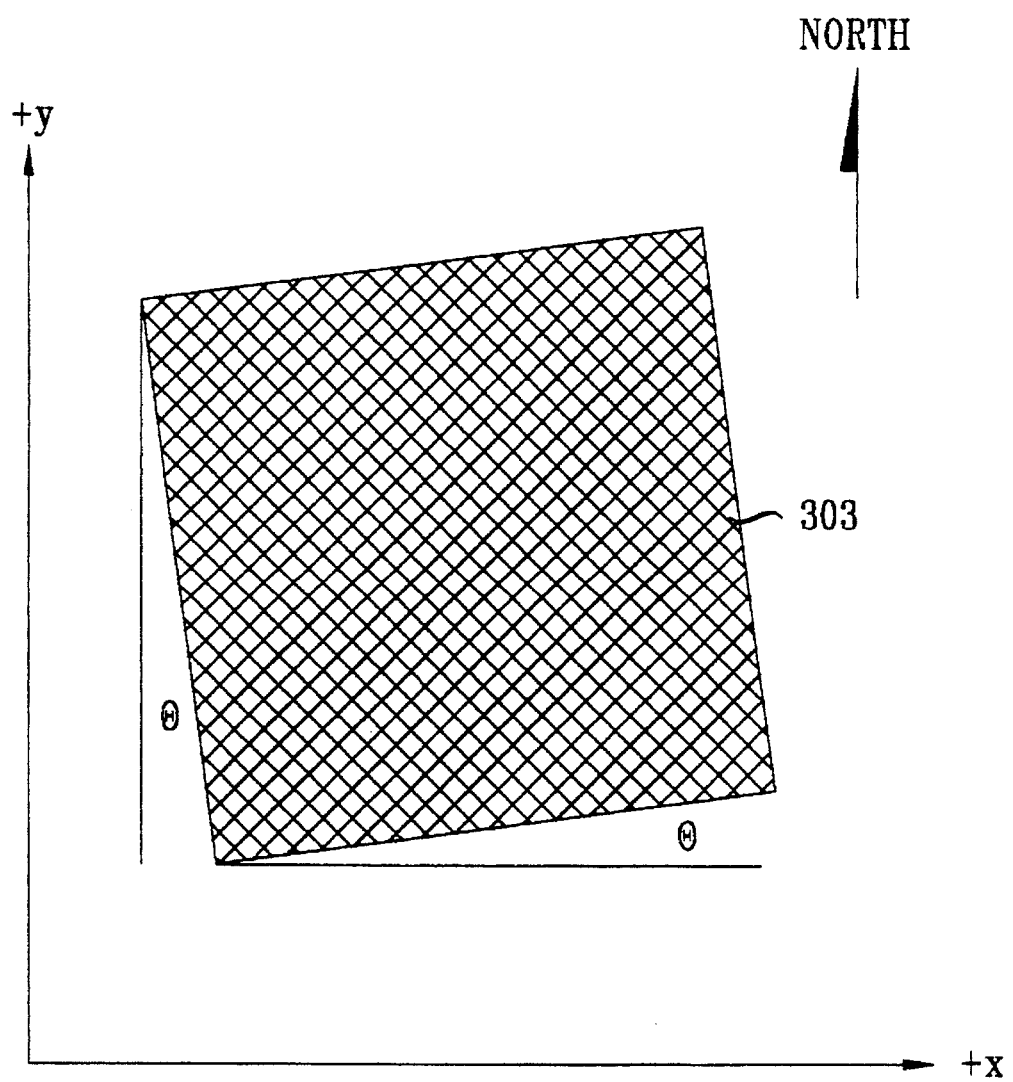
FIG. 7 depicts the illustrative fiducial as shown in FIG. 1 and its angular orientation with respect to the rows and columns of window elements in the sampling window depicted in FIG. 4.
Figure 8:
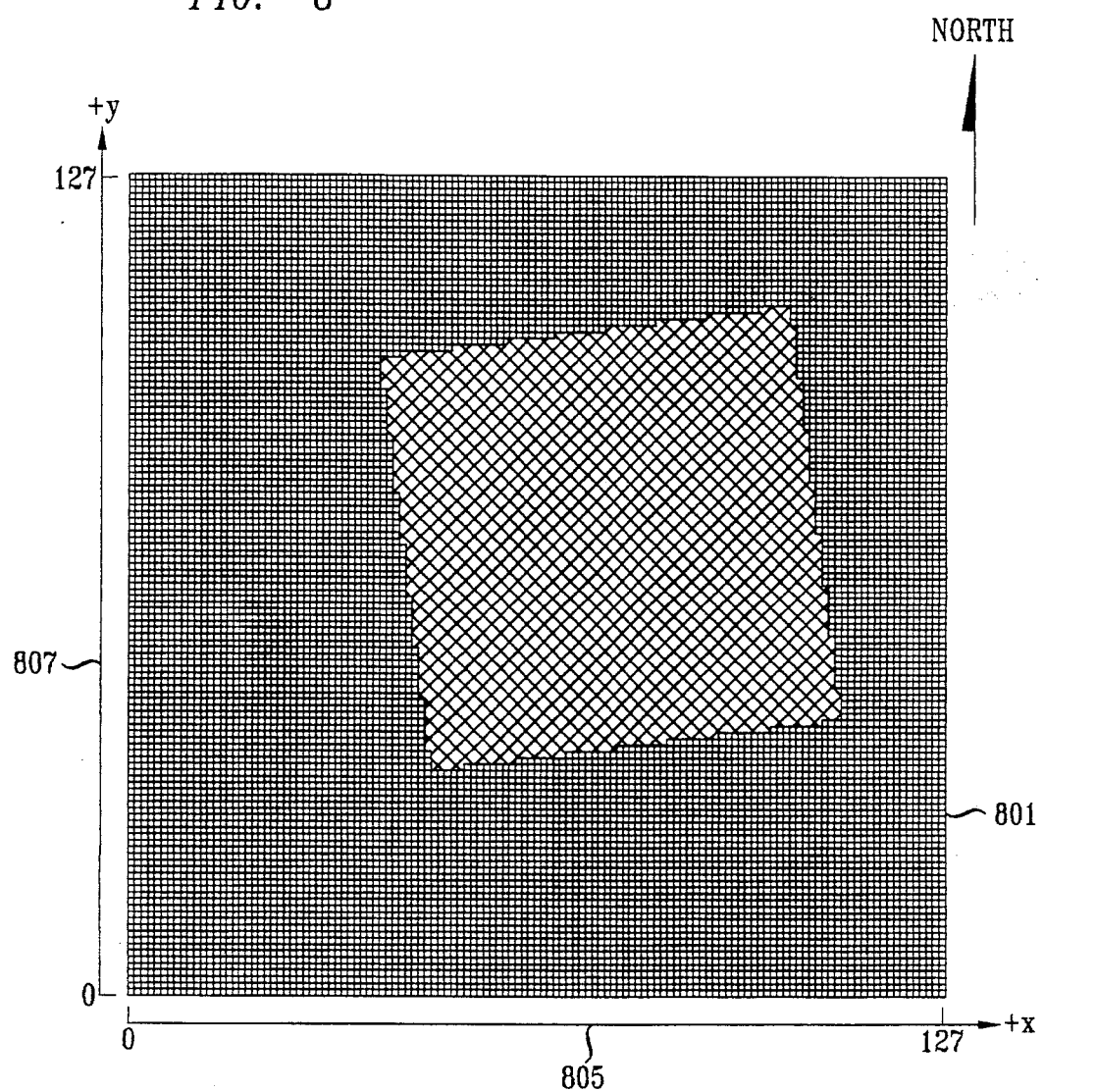
FIG. 8 depicts an illustrative sampling window which represents an image containing the fiducial shown in FIG. 7.

Orientation: As shown in FIG. 7, it is preferred that fiducial 103 be oriented in the X-Y plane so that when fiducial 103 is viewed through videocamera 109, the sides of fiducial 103 form a predetermined angle, θ, with respect to the axes of the columns and rows of the sampling window. This "tilting" of fiducial 103 with respect to the axes of the sampling window is advantageous in that it promotes the destructive interference of distortions caused by the physical limitations of videocamera 109.

While it is preferred that θ be an oblique angle, the effects of tilting are equivalent for 0°, 45°, 90°, 135° 180°, etc. and for each octant of 45°. Angles close to 0° or 45° enable potentially more precise measurements while angles centered between 0° and 45° (i.e., =22.5°) enable measurements which are less susceptible to noise. Advantageously, θ is chosen to be $\cotan^{-1}(8)$ which is substantially 7.125°. It will be clear to those skilled in the art how to fabricate embodiments of the present invention which use different angles of θ.

IV. The Operation of the Illustrative Embodiment

Figure 3:
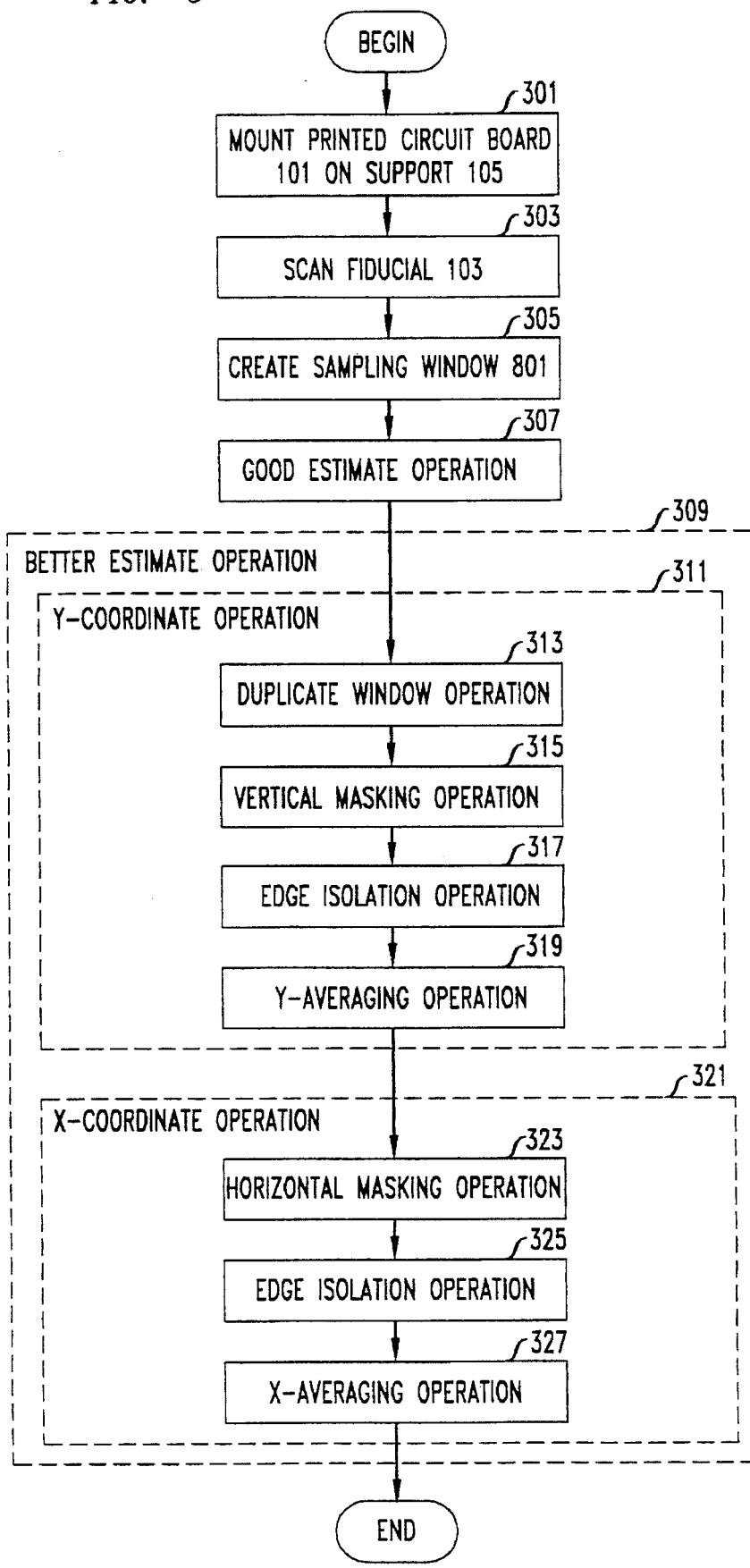
FIG. 3 presents a flowchart which depicts the operation of the illustrative embodiment.

FIG. 3 presents a flow chart which depicts the operation of the illustrative embodiment depicted in FIGS. 1 and 2. The operation of the illustrative embodiment begins at block 301 when printed circuit board 101 is mounted on support 105. As described above, printed circuit board 101 is advantageously mounted on support 105 so that the above fiducial criteria relating to size and orientation are satisfied.

As depicted at block 303, videocamera 109 periodically, or on command, scans fiducial 103 and transmits to video capture circuitry 255 over lead 107 a set of video signals which represent the field of view of videocamera 109. As depicted at block 305, video capture circuitry 255 applies these signals in ordered sequence into RAM 253 to create sampling window 801. Because each image element in sampling window 801 represents some information about a distinct region in the field of view of videocamera 109, video capture circuitry 255 advantageously assigns an informative "token" (e.g., "Black" or "White") to each image element so that sampling window 801, in toto, represents the field of view of videocamera 109 when the scan was made.

In the illustrative embodiment, a image element assigned a "BLACK" token is advantageously defined as representing a region which is darker than some threshold intensity (i.e., reflects less than some threshold intensity of light incident on a portion of printed circuit board 101). Congruously, a image element is assigned a "WHITE" token when it is not assigned a BLACK token. It will be clear to those skilled in the art how to fabricate embodiments of the present invention in which the window elements may be assigned characteristics which represent color or gray-scales.

The respective image elements in sampling window 801 which are depicted as black are assigned the token BLACK and represent the field of view of videocamera 109 containing fiducial 103. The window elements which are depicted as white are assigned the token WHITE and represent the field of view of videocamera 109 containing the background 603 surrounding fiducial 103.

While sampling window 801 may assume any one of numerous configurations, it is preferred that it comprise a 128×128 array of square image elements which are tiled in orthogonal rows and columns. Each image element in sampling window 801 is identified by a cartesian coordinate pair. For example, image element (0,127) is the window element in the north-west corner of sampling window 801 and window element (127,127) is the image element in the north-east corner of sampling window 801. It will be clear to those skilled in the art how to fabricate embodiments of the present invention which employ sampling windows with different dimensions (e.g., rectangular or nonorthogonal) or image elements with different shapes.

While video capture circuitry 255 only assigns two tokens ("BLACK" and "WHITE"), it is preferred that processor 251 be capable assigning a third token, "NULL," to each image element. A NULL token provides no information about the field of view of videocamera 109 but is used as a placeholder in subsequent calculations.

As shown at FIG. 3, processor 251 advantageously estimates the location of the centroid of fiducial 103 in two phases: (1) a "good estimate operation" (block 307) and (2) a "better estimate operation" (block 309). The good estimate operation (block 307) estimates the centroid of fiducial 103 by analyzing all of the image elements in sampling window 801. It should be noted that all operations described in this specification to be executed by processor 251 from procedures stored in ROM 259 are performed by the illustrative program listing disclosed in Appendix I. It will be clear to those skilled in the art how to use and/or modify this program listing to fabricate and use other embodiments of the present invention.

Specifically, the good estimate operation (block 307) estimates the X-coordinate of the centroid of fiducial 103, $X_g$, by averaging the X-coordinates of all of the image elements assigned a BLACK token. Analagously, the good estimate operation (block 307) estimates the Y-coordinate of the centroid of fiducial 103, $Y_g$, by averaging the Y-coordinates of all the image elements assigned a BLACK token. It will be clear to those skilled in the art how to program processor 251 to perform the good estimate operation. The good estimate operation (block 307) yields as an estimate of the centroid of fiducial 103 in sampling window 801 ($X_g$=75.74, $Y_g$=71.09).

After processor 251 performs the good estimate operation (block 307), processor 251 begins executing the better estimate operation (block 309) as shown in FIG. 3. It is preferred that the better estimate operation (block 309) advantageously estimate the centroid of fiducial 103 by analyzing only one or more of those image elements in sampling window 801 which define an edge of fiducial 103. It should be noted that an edge can be represented by either image elements which are assigned BLACK tokens or by image elements which are assigned WHITE tokens.

Specifically, the better estimate operation (block 309) advantageously estimates the X-coordinate of the centroid of fiducial 103, $X_b$, by averaging the X-coordinates of some of the image elements which define the two edges of fiducial 103 which are most parallel to the Y-axis. Analagously, the better estimate operation (block 309) advantageously estimates the Y-coordinate of the centroid of fiducial 103, $Y_b$, by averaging the Y-coordinates of some of the image elements which define the two edges of fiducial 103 which are most parallel to the X-axis.

The better estimate operation (block 309) itself comprises: a "Y-coordinate operation" (block 311) and an "X-coordinate operation" (block 321). It will be clear those skilled in the art how to fabricate embodiments of the invention which perform only one of these two operations or which perform them both in either order, or perform them simultaneously on a multi-tasking or multiprocessor system.

The Y-coordinate operation (block 311) advantageously comprises: (1) a "duplicate window operation" (block 313), (2) a "vertical masking operation" (block 315), (3) an "edge isolation operation" (block 317) and (4) a "Y-averaging operation" (block 319).

In the duplicate window operation (block 313) processor 251 makes a duplicate of sampling window 801 (hereinafter the "duplicate sampling window"—not shown in Figures) in RAM 253. All steps performed by processor 251 during the execution of Y-coodinate operation (block 311) operate on the duplicate sampling window. The original sampling window 801 is preserved for the X-coordinate operation (block 321).

After processor 251 has completed the duplicate window operation (block 313), it performs the vertical masking operation (block 315) on the duplicate sampling window. The vertical masking operation (block 315) is advantageous in that performs two functions: (1) it allows the image elements which define the more vertical edges of fiducial 103 to be isolated from the image elements which define the more horizontal edges, and (2) it further promotes the destructive interference of distortions due to the physical limitations of videocamera 109.

The vertical masking operation (block 315) reassigns a NULL token to each image element in the duplicate sampling window which has an X-coordinate below or equal to $X_L$, or above $X_H$. The values $X_L$ and $X_H$ are advantageously determined by satisfying equations (2) and (3) simultaneously;

$$X_H - X_g = X_g - X_L \qquad \text{(Eq. 2)}$$

and $$X_H - X_L = \frac{dn\cos\theta}{2f} . \qquad \text{(Eq. 3)}$$

Equation (2) advantageously assures that the unmasked region is centered about the good estimate of the centroid of fiducial 103. This has two beneficial effects. First, it eliminates noise which tends to occur at the corners of a fiducial and, second, it serves to isolate the image elements which define the upper and lower edges of fiducial 103 from the left and right edges.

Equation (3) advantageously assures that the number of image elements which respectively define the upper and lower edges are equal to "a multiple of the period of the fiducial." The period of the fiducial indicates approximately how many columns a portion of the edge of the fiducial must traverse to traverse one row. It is preferred that the number of image elements used in the Y-averaging operation (block 319) equal an integral multiple of the period of the fiducial because it further causes the distortions caused by by the physical limitations of videocamera 109 to cancel.

From above, d=0.504", n=128, θ=7.125°, f=1.0" and $X_g$= 75.74. From equation (3):

$$X_H - X_L = \frac{0.504'' \times 128 \times \cos(7.125°)}{2 \times 1.0''} = 32.00 \quad \text{(Eq. 3a)}$$

and equation (2);

$$X_H - 75.74 = 75.74 - X_L, \quad \text{(Eq. 2a)}$$

Figure 9:
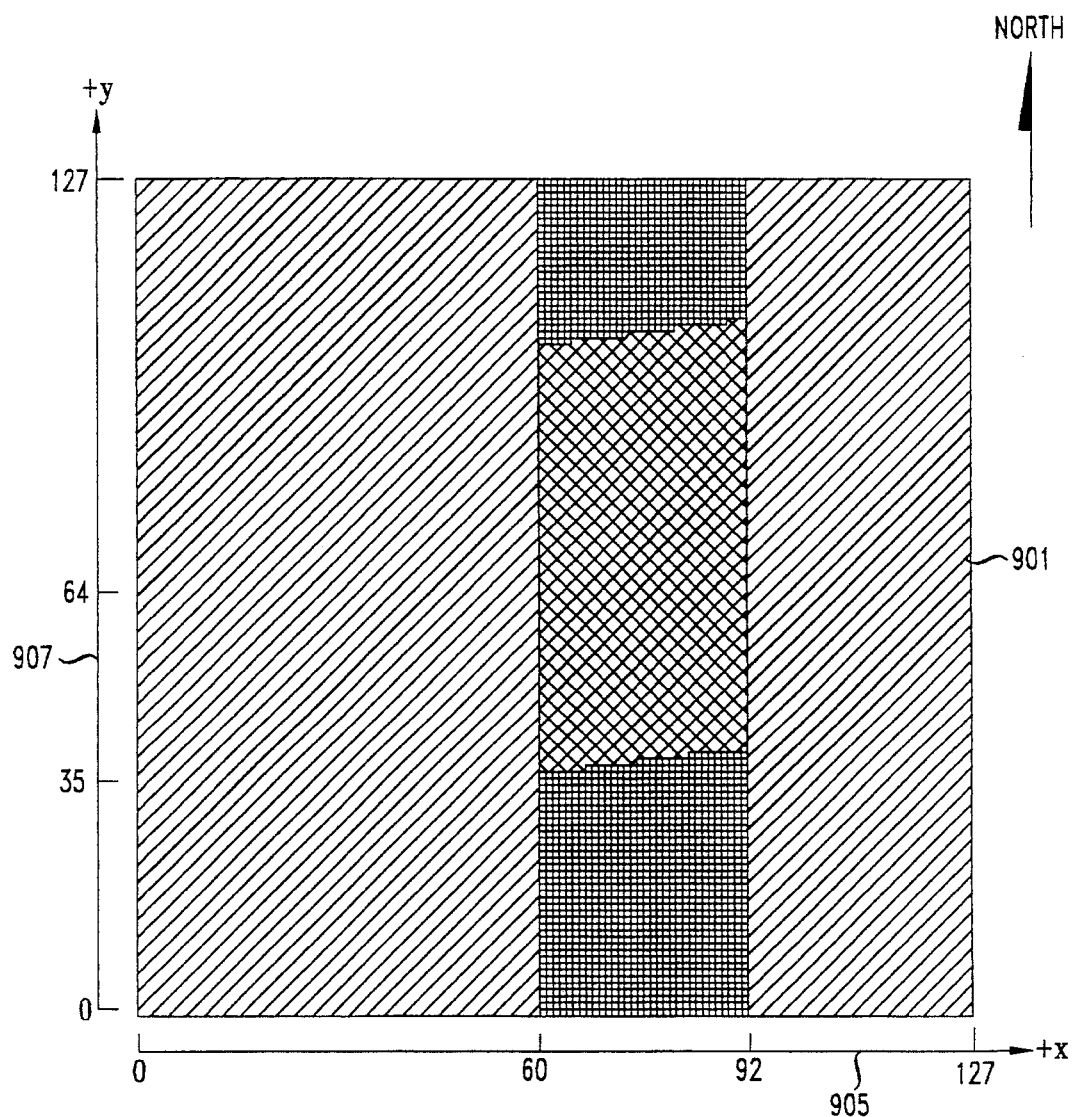
FIG. 9 depicts the sampling window shown in FIG. 8 as it has been masked to isolate a portion of the fiducial equal to a vertical period of the fiducial.

Solving equations (3a) and (2a) simultaneously yields, rounding to the nearest integer, $X_H$=92 and $X_L$=60. It will be clear to those skilled in the art how to determine $X_H$ and $X_L$ given different parameters. Thus, processor 251 assigns all window elements with X-coordinates greater than 92 or less than or equal to 60 a NULL token. The masked duplicate sampling window is depicted at 901 in FIG. 9. Those image elements which are assigned NULL tokens appear with cross-hatches. At this point the vertical masking operation (block 315) is complete.

The edge isolation operation (block 317) advantageously identifies a subset of the image elements in the masked duplicate sampling window as "edge image elements." For the purpose of this specification an edge image element is defined as a image element which defines an edge on fiducial 103. In the illustrative embodiment an edge image element is advantageously defined as a image element which is assigned a BLACK token and which has at least one "neighbor image element" which is assigned a WHITE token. As a corrollary to this advantageous definition, a image element which is assigned a NULL or a WHITE token can never be an edge image element.

Figure 5:
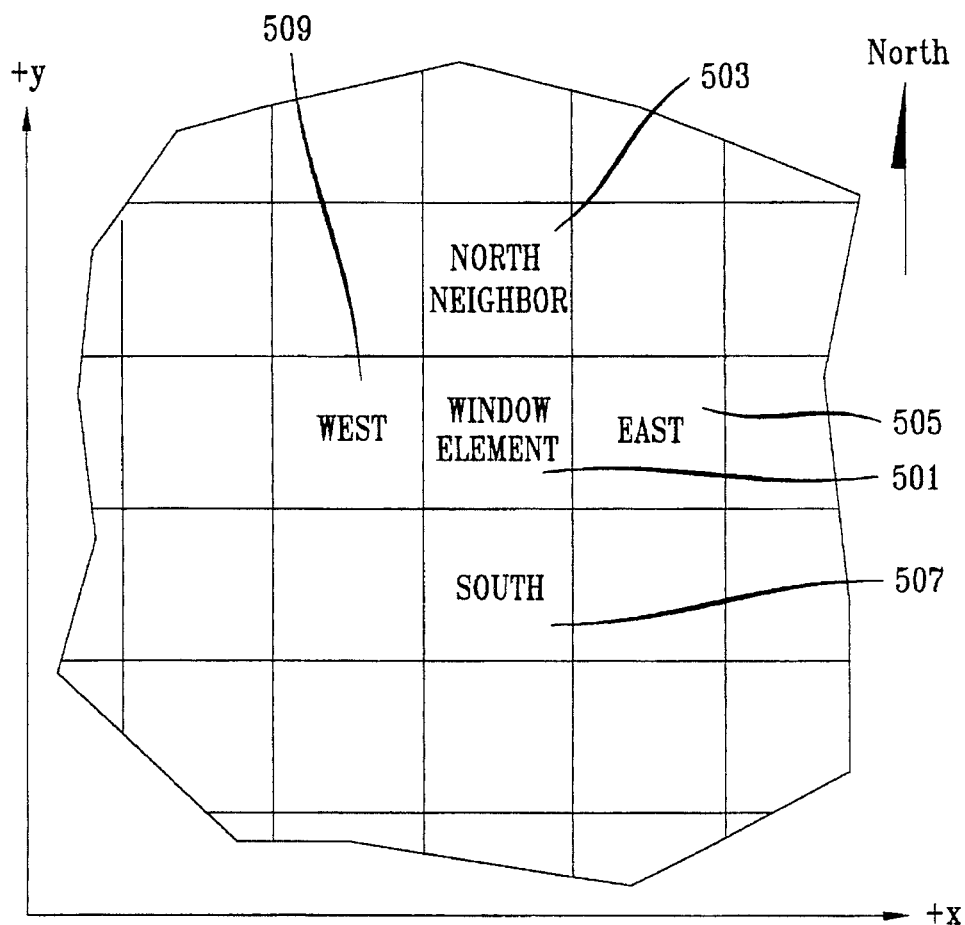
FIG. 5 depicts an illustrative relationship of a reference window element to its respective neighbor image elements.

For the purposes of this specification, a neighbor image element is defined as a image element which has a coordinate relationship with respect to another image element. In the illustrative embodiment (as shown in FIG. 5), image element 501 is advantageously defined to have four neighbor image elements: image element 503 (to the north of image element 501), image element 505 (to the east of window element 501), image element 507 (to the south of image element 501) and image element 509 (to the west of image element 501). It will be clear to those skilled in the art how to program processor 251 to perform the edge isolation operation (block 317). It will be clear to those skilled in the art how to fabricate and practice embodiments of the present invention in which the definition of neighbor image elements is different (e.g., includes image elements to the north-east, south-east, south-west and north-west of a given image element).

Figure 10:
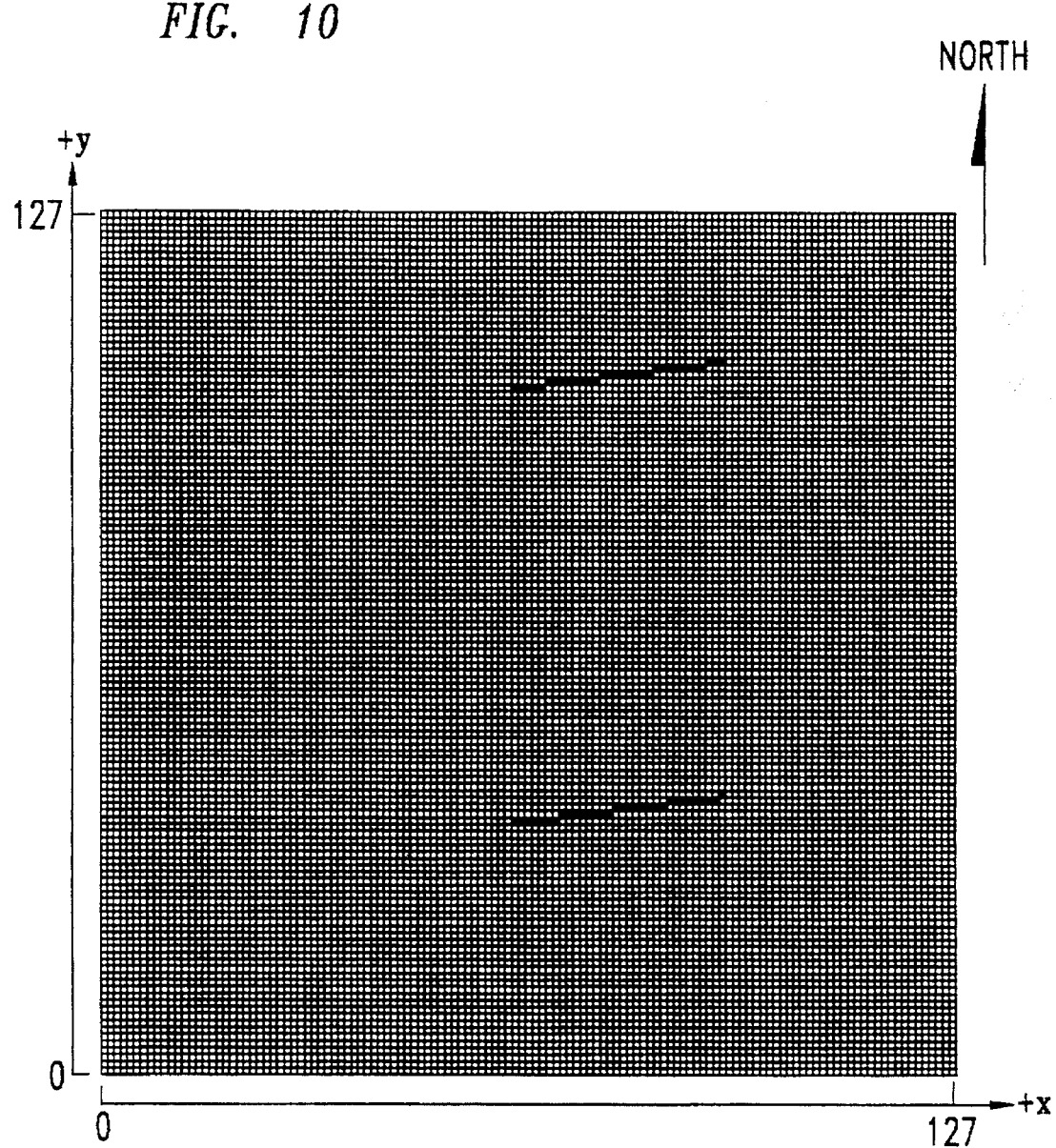
FIG. 10 depicts the sampling window shown in FIG. 9 as it further isolates a set of image elements which partially define the more horizontal edges of the fiducial.

When the edge isolation operation (block 317) is complete, the result is the duplicate sampling window depicted in FIG. 10 (all of the image elements are assigned a WHITE token and appear white except for the edge image elements which are assigned a BLACK token and appear black).

The last step in the Y-coordinate operation (block 311) is the Y-averaging operation (block 319). In the Y-averaging operation (block 319), processor 251 determines the better estimate, $Y_b$, of the Y-coordinate of the centroid of fiducial 103 by averaging the Y-coordinates of all of the edge image elements (i.e., those window elements in the duplicate sampling window, as depicted in FIG. 10, which are assigned a BLACK token). In the illustrative embodiment, the better estimate of the Y-coordinate of fiducial 103 is determined by processor 251 to be $Y_b$=68.87.

It will be clear to those skilled in the art how to utilize only a subset of the edge image elements. It will also be clear to those skilled in the art how to estimate the Y-coordinate of the centroid of fiducial 103 after the vertical mask operation (block 317) and before the edge isolation operation (block 319).

When the Y-coordinate operation (block 311) is compleeae processor 251 advantageously begins execution of the X-coordinate operation (block 321). The X-coordinate operation (block 321) advantageously comprises: (1) a "horizontal masking operation" (block 323), (2) an "edge isolation operation" (block 325) and (3) a "X-averaging operation" (block 327).

Processor 521 begins the X-coordinate operation (block 321) by performing the horizontal masking operation (block 315) on the original sampling window 801 which was left undisturbed by the Y-coordinate operation (block 311). The horizontal masking operation (block 315) is analagous to the vertical masking operation (block 315) and is advantageous for analagous reasons.

The horizontal masking operation (block 315) reassigns a NULL token to each image element in the duplicate sampling window which has an Y-coordinate below or equal to $Y_L$, or above $Y_H$. The values $Y_L$ and $Y_H$ are advantageously determined by satisfying equations (4) and (5) simultaneously;

$$Y_H - Y_g = Y_g - Y_L \quad \text{(Eq.4)}$$

and $$Y_H - Y_L = \frac{dn\cos\theta}{2f} . \quad \text{(Eq. 5)}$$

Equation (4) is analogous to equation (2) and is advantageous for analogous reasons and equation (5) is analogous to equation (3) and is advantageous for analogous reasons.

From above, d=0.504", n=128, θ=7.125°, f=1.0" and $Y_g$=71.09. From equation (3):

$$Y_H - Y_L = \frac{0.504'' \times 128 \times \cos(7.125°)}{2 \times 1.0''} = 32.00 \quad \text{(Eq. 5a)}$$

and equation (2);

$$Y_H - 71.09 = 71.09 - Y_L, \quad \text{(Eq. 4a)}$$

Solving equations (4a) and (5a) simultaneously yields, rounding to the nearest integer, $Y_H$=87 and $X_L$=55. It will be clear to those skilled in the art how to determine $X_H$ and $X_L$ given different parameters. Thus, processor 251 assigns all window elements with Y-coordinates greater than 87 or less than or equal to 55 a NULL token. The masked duplicate sampling window is depicted at 1101 in FIG. 11. Those image elements which are assigned NULL tokens appear with cross-hatches. At this point the horizontal masking operation (block 323) is complete.

Figure 11:
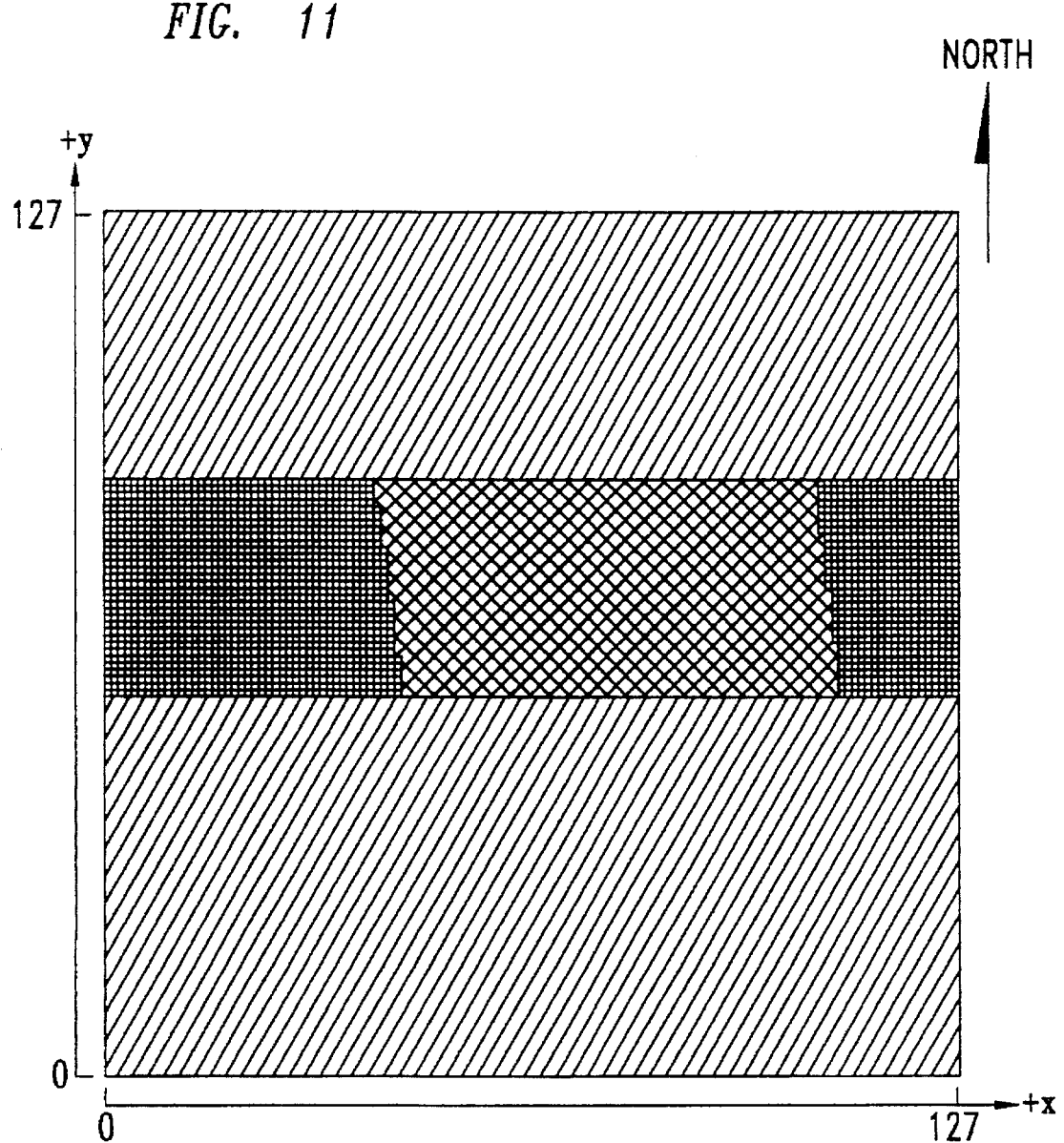
FIG. 11 depicts the sampling window shown in FIG. 8 as it has been masked to isolate a portion of the fiducial equal to a horizontal period of the fiducial.
Figure 12:
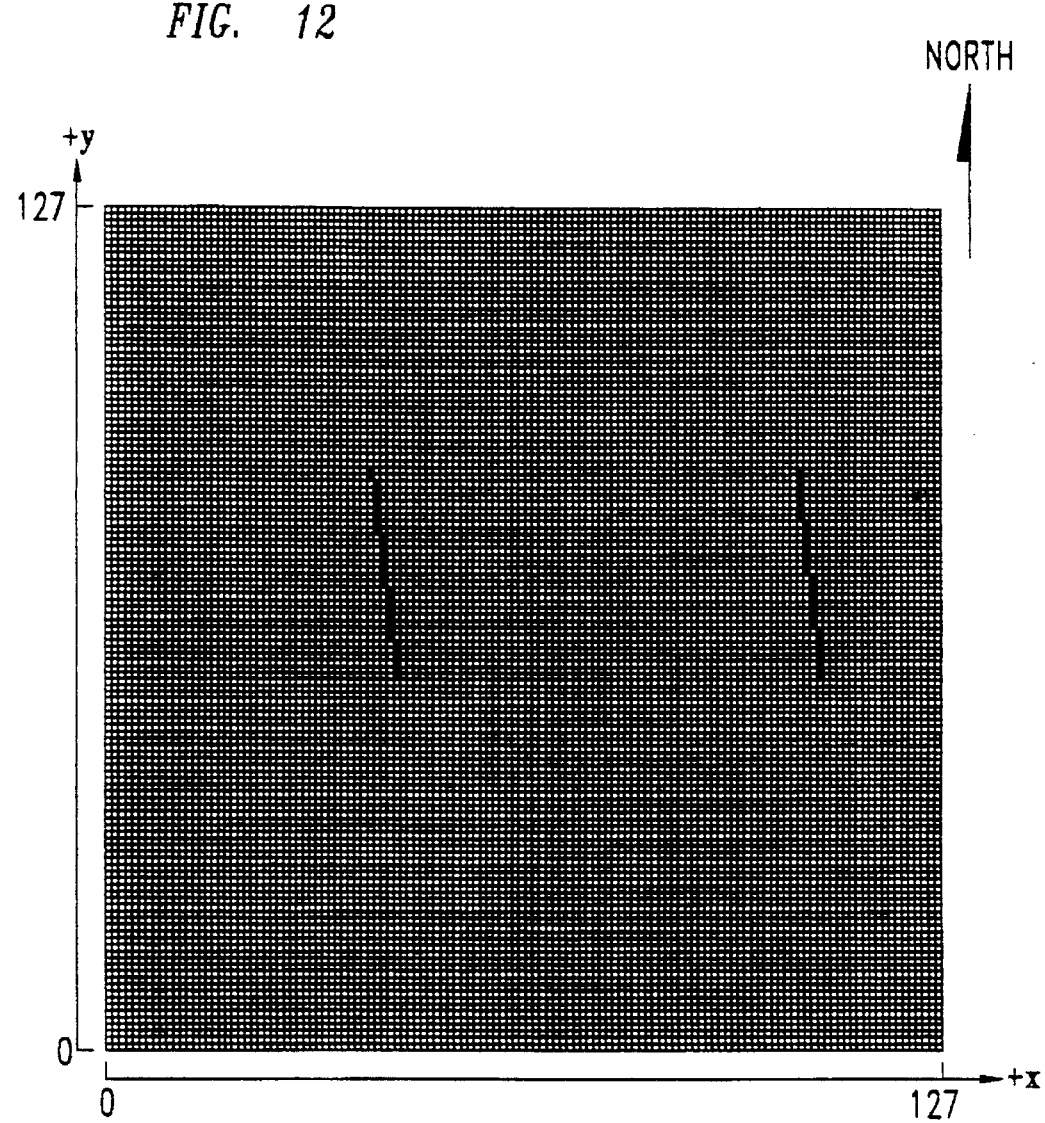
FIG. 12 depicts the sampling window shown in FIG. 11 as it further isolates a set of image elements which partially define the more vertical edges of the fiducial.

The edge isolation operation (block 325) is identical to the edge isolation operation (block 317) in the Y-coordinate operation (block 311) and produces from the masked sampling window of FIG. 11 the sampling window depicted in FIG. 12 (all of the image elements are assigned a WHITE token and appear white except for the edge window elements which are assigned a BLACK token and appear black).

The last step in the X-coordinate operation (block 321) is the X-averaging operation (block 327). In the X-averaging operation (block 327), processor 251 determines the better estimate, $X_b$, of the X-coordinate of the centroid of fiducial 103 by averaging the X-coordinates of all of the edge image elements (i.e., those window elements in the duplicate sampling window, as depicted in FIG. 12, which are assigned a BLACK token). In the illustrative embodiment, the better estimate of the X-coordinate of fiducial 103 is determined by processor 251 to be $X_b$=71.65.

It will be clear to those skilled in the art how to utilize only a subset of the edge image elements depicted in FIG. 12. It will also be clear to those skilled in the art how to estimate the X-coordinate of the centroid of fiducial 103 after the horizontal mask operation (block 323) and before the edge isolation operation (block 325).

At this point the X-coordinate operation (block 321) and the better estimate operation (block 309) have completed execution. The better estimate of the centroid of fiducial 103 has been determined according to the illustrative embodiment to be $X_b$=71.65, $Y_b$=68.87. Robot drive circuitry 257 can relay those coodinates, via lead 121 to robot insertion tool 123 for use in inserting components into printed circuit board 101.

Robot insertion tool 123 advantageously comprises means for moving robot arm 125 in the X and Y directions so that robot arm 125 may populate printed circuit board 101 according to the specifics of the particular embodiment.

It should be noted that all operations described in this specification to be executed by processor 251 from procedures stored in ROM 259 are performed by the illustrative program listing disclosed in Appendix I. It will be clear to those skilled in the art how to use and/or modify this program listing to fabricate and use other embodiments of the present invention.

APPENDIX I

C Implementation of Procedure for Determining Location of Fiducial
The following is a C Program that when run on a general purpose
computer implements an apparatus for determining the location
of a fiducial given a sampling plane.

```
/* LOCATE_FID:               function precisely locates fiducial by its x and y centroids
 *                           usage: locate_fid (image, xSize, ySize,
 *                                 &xCentroid, &yCentroid)
 *                           Function returns (xCentroid, yCentroid)
 */
#define OFF 0                                /* OFF value of binary image */
#define ON 1                                 /* ON value of binary image */
#define HALFMASKSIZE 16                      /* half of the mask size */
#define NORTH(X,Y) image[y-1] [x]            /* value of north neighbor */
#define SOUTH(X,Y) image[y+1] [x]            /* value of south neighbor */
#define EAST(X,Y) image[y] [x+1]                /* value of east neighbor */
#define WEST(X,Y) image [y] [x-1]               /* value of west neighbor */
locate_fid (image, xSize, ySize, xCentroid, yCentroid)
unsigned char **image;                       /* 2-D image array of x,y pixel values */
long xSize, ySize;                           /* x,y dimensions of image [pixels] */
double *xCentroid, *yCentroid;                  /* output x,y centoids of fiducial */
{
double xCentroidEst,                         /* estimated x,y centroids */
       yCentroidEst;
long nOn;                                    /* number of ON pixels in calculation */
long x,y;                                    /* x,y column and row image coordinates */
long XL, XH,                                 /* x low and high bounds of mask */
     YL, YH;                                 /* y low and high bounds of mask */
long nEdge;                                  /* number of edge pixels in calculation */
/* rough centroid estimate from all ON pixels making up fiducial */
xCentroidEst = yCentroidEst = 0.0;
nOn = 0;
for (y = 0; y < ySize; y++) {
  for (x = 0; x < xSize; x++) {
    if (image[y] [x] == ON) {
      xCentroidEst += x;
      yCentroidEst += y;
      nON++;
    }
  }
}
xCentroidEst = xCentroidEst / nOn;
yCentroidEst = yCentroidEst / nOn;
/* determine the x,y mask bounds */
   XL = (long) (xCentroidEst - HALFMASKSIZE + 0.5);
   XH = (long) (xCentroidEst + HALFMASKSIZE + 0.5);
   YL = (long) (yCentroidEst - HALFMASKSIZE + 0.5);
   YH = (long) (yCentroidEst - HALFMASKSIZE + 0.5);
/* precisely determine x centroid from the edge pixels within mask bounds */
   *xCentroid = 0.0;
   nEdge = 0;
   for (y = YL; y < YH; y++) {
```

APPENDIX I-continued

C Implementation of Procedure for Determining Location of Fiducial
The following is a C Program that when run on a general purpose
computer implements an apparatus for determining the location
of a fiducial given a sampling plane.

```
       for (x = 0; x < xSWize; x++) {
         if (image[y] [x] == ON       /* determine edge pixel */
            && (NORTH(x,y) == OFF SOUTH(x,y) == OFF
                              EAST(x,y) == OFF    WEST(x,y) == OFF)){
           *Centroid += x;
           nEdge++;
           }
         }
       }
       *xCentroid = *xCentroid / nEdge;
   /* precisely determine y centroid from the edge pixels within mask bounds */
       *yCentroid = 0.0;
       nEdge = 0;
       for (x = XL; x < XH; x++) {
         for (y = 0; y < ySize; y++){
           if (image[y] [x] == ON       /* determine edge pixel */
              && (NORTH(x,y) == OFF    SOUTH(x,y) == OFF
                                EAST(x,y) == OFF    WEST(x,y) == OFF)){
             *yCentroid += y;
             nEdge++;
             }
           }
         }
       *yCentroid = *yCentroid / nEdge;
       return;
   }
```

We claim:

1. An apparatus for locating an object on a substrate, the object, from the perspective of an input device, having at least one substantially straight edge, said apparatus comprising:

said input device for capturing an image of at least a portion of said substantially straight edge, and for creating a sampling window comprising an array of image elements which are arranged in a plurality of substantially parallel rows;

a device that orients said substrate with respect to said input device such that an image of said substantially straight edge of said object and at least one of said rows intersect at an angle that is both predetermined and oblique;

a circuit that determines as edge image elements a number of said image elements which define said substantially straight edge for use in determining the precise location of said object on said substrate, said number being determined using a trigonometric function of said angle such that said number is approximately an integral multiple of the number of edge image elements that are in a row of said sampling window; and a circuit that precisely locates said object on said substrate based on the relative positions of said number of edge elements.

2. The apparatus of claim 1 wherein said object is a fiducial registration mark on a printed circuit board and said input device is a videocamera.

3. The apparatus of claim 2 wherein said fiducial registration mark is a rhombus comprising a first pair of opposite edges and a second pair of opposite edges.

4. The apparatus of claim 3 wherein said circuit that determines comprises a circuit that isolates said images elements representing said first pair of opposite edges from said images elements representing said second pair of opposite edges.

5. The apparatus of claim 4 wherein said circuit that precisely locates comprises a circuit that precisely locates said fiducial registration mark in a first dimension based on said images elements representing said first pair of opposite edges.

6. The apparatus of claim 5 wherein said circuit that precisely locates further comprises a circuit that locates said fiducial registration mark in a second dimension based on said images elements representing said second pair of opposite edges.

7. A method for locating an object on a substrate, the object, from the perspective of an input device, having at least one substantially straight edge, said method comprising the steps of:

scanning, with said input device, at least a portion of said substantially straight edge and creating a sampling window comprising an array of images elements which are arranged in a plurality of substantially parallel rows;

orienting said substrate with respect to said input device such that an image of said substantially straight edge of said object and at least one of said rows intersect at an angle that is both predetermined and oblique;

determining as edge image elements a number of said image elements which define said substantially straight edge for use in determining the precise location of said object on said substrate, said number being determined using a trigonometric function of said angle such that said number is approximately an integral multiple of the number of image elements of said substantially straight edge that are in a row of said sampling window;

precisely locating said object on said substrate based on the relative positions of said number of edge image elements.

8. The method of claim 7 wherein said object is a fiducial registration mark on a printed circuit board and said input device is a videocamera.

9. The method of claim 8 wherein said fiducial registration mark is a rhombus comprising a first pair of opposite edges and a second pair of opposite edges.

10. The method of claim 9 wherein said step of identifying comprises the step of isolating said edge elements representing said first pair of opposite edges from said edge elements representing said second pair of opposite edges.

11. The method of claim 10 wherein said step of locating comprises the step of locating said fiducial registration mark in a first dimension based on said edge elements representing said first pair of opposite edges.

12. The method of claim 11 wherein said step of locating further comprises the step of locating said fiducial registration mark in a second dimension based on said edge elements representing said second pair of opposite edges.

* * * * *